(12) United States Patent
Watazu et al.

(10) Patent No.: US 9,885,620 B2
(45) Date of Patent: Feb. 6, 2018

(54) PRESSURE DETECTING APPARATUS, METHOD OF CONTROLLING THE PRESSURE DETECTING APPARATUS, AND PROGRAM

(71) Applicant: NISSHA PRINTING CO., LTD., Kyoto-shi (JP)

(72) Inventors: Yuji Watazu, Kyoto (JP); Naoto Imae, Kyoto (JP); Eiji Kakutani, Kyoto (JP); Keisuke Ozaki, Kyoto (JP); Shinichi Hagihara, Kyoto (JP); Junichi Shibata, Kyoto (JP)

(73) Assignee: NISSHA PRINTING CO., LTD., Kyoto-shi (JP)

( * ) Notice: Subject to any disclaimer, the term of this patent is extended or adjusted under 35 U.S.C. 154(b) by 0 days.

(21) Appl. No.: 15/306,271

(22) PCT Filed: Sep. 17, 2015

(86) PCT No.: PCT/JP2015/076444
§ 371 (c)(1),
(2) Date: Oct. 24, 2016

(87) PCT Pub. No.: WO2016/059935
PCT Pub. Date: Apr. 21, 2016

(65) Prior Publication Data
US 2017/0052074 A1 Feb. 23, 2017

(30) Foreign Application Priority Data

Oct. 17, 2014 (JP) .................. 2014-213241

(51) Int. Cl.
*G01L 1/16* (2006.01)
*G06F 3/00* (2006.01)
(Continued)

(52) U.S. Cl.
CPC .................. *G01L 1/16* (2013.01); *G06F 3/00* (2013.01); *G01L 1/146* (2013.01); *G06F 3/0414* (2013.01); *G06F 3/0416* (2013.01); *G06F 3/0418* (2013.01)

(58) Field of Classification Search
CPC .... G06F 3/0414; G06F 3/0418; G06F 3/0416; G06F 3/045; G01L 1/146
(Continued)

(56) References Cited

U.S. PATENT DOCUMENTS 4,962,328 A * 10/1990 Woss ........................ H03F 3/70
327/540
7,049,729 B2 * 5/2006 Kashiwase ............ G01L 23/222
123/395

(Continued)

FOREIGN PATENT DOCUMENTS

JP 56-51641 A 5/1981
JP 2013-246557 A 12/2013
JP 2014-134452 A 7/2014

OTHER PUBLICATIONS

International Search Report dated Oct. 27, 2015 in PCT/JP2015/076444 filed Sep. 17, 2015.

*Primary Examiner* — Jonathan Dunlap
(74) *Attorney, Agent, or Firm* — Oblon, McClelland, Maier & Neustadt, L.L.P.

(57) ABSTRACT

In a pressure detecting apparatus, a pressure sensor includes a piezoelectric sheet that generates a piezoelectric signal according to a load that is applied. A touch detecting unit detects contact with the pressure sensor. An acquirer acquires a piezoelectric output based on the piezoelectric signal. A rate-of-change calculator calculates a rate of change with respect to time of the piezoelectric output acquired within an arbitrary time range before a touch detection time when the touch detecting unit detects contact (Continued)

with the pressure sensor. An applied pressure calculator calculates applied pressure by correcting the piezoelectric output acquired after an end time of the time range used in the calculation of the rate of change using the rate of change. The apparatus enables precise measurement of applied pressure in a pressure sensor.

5 Claims, 3 Drawing Sheets

(51) Int. Cl.
*G06F 3/041* (2006.01)
*G01L 1/14* (2006.01)

(58) Field of Classification Search
USPC .............. 345/173–174; 73/862.621–862.623
See application file for complete search history.

(56) References Cited

U.S. PATENT DOCUMENTS

| | | | | |
|---|---|---|---|---|
| 7,117,725 | B2* | 10/2006 | Okubo | G01L 23/225 73/114.21 |
| 7,212,912 | B2* | 5/2007 | Okubo | G01L 23/225 701/111 |
| 8,479,584 | B2* | 7/2013 | Ohsato | G01L 1/26 73/760 |
| 9,134,868 | B2* | 9/2015 | Chang | G06F 3/044 |
| 2003/0210235 | A1* | 11/2003 | Roberts | G06F 3/0414 345/173 |
| 2005/0199049 | A1* | 9/2005 | Okubo | G01L 23/225 73/114.21 |
| 2011/0259111 | A1* | 10/2011 | Ohsato | G01L 1/26 73/766 |
| 2014/0062949 | A1* | 3/2014 | Chang | G06F 3/044 345/174 |
| 2016/0342257 | A1* | 11/2016 | Watazu | G06F 3/0414 |
| 2017/0131840 | A1* | 5/2017 | Deichmann | G06F 3/0418 |

* cited by examiner

PRESSURE DETECTING APPARATUS, METHOD OF CONTROLLING THE PRESSURE DETECTING APPARATUS, AND PROGRAM

TECHNICAL FIELD

The present invention relates to a pressure detecting apparatus using a piezoelectric sheet that generates a piezoelectric signal according to a load that is applied, a method of controlling the pressure detecting apparatus, and a program.

BACKGROUND ART

Pressure sensors are known which use piezoelectric sheets in order to detect the amount of pressure applied to, for example, touch panels. For example, PTL 1 discloses a transparent piezoelectric sensor composed of a transparent pressure sensitive layer and a pair of transparent conductive film layers.

CITATION LIST

Patent Literature

PTL 1: Japanese Unexamined Patent Application Publication No. 2004-125571

SUMMARY OF INVENTION

Technical Problem

In such a piezoelectric sensor using a piezoelectric sheet disclosed in PTL 1, electric charge may be generated on the piezoelectric sheet due to pyroelectricity or thermal stress upon occurrence of change in temperature and a piezoelectric signal that linearly increases or decreases may be output. This output is called "drift noise". As a result, the drift noise is superimposed on the original piezoelectric signal to make accurate measurement of applied pressure difficult.

The "pyroelectricity" is a feature of the piezoelectric sheet made of polyvinylidene difluoride (PVDF) or the like, in which electric charge is generated upon occurrence of change in temperature. In this description, the "thermal stress" is internal stress of the piezoelectric sheet, which is caused due to occurrence of change in temperature in a pressure detector or a touch panel. In other words, the "thermal stress" is, for example, stress that is caused by the piezoelectric sheet the thermal expansion or the thermal contraction of which is prevented by a support substrate or the touch panel when the piezoelectric sheet is arranged on the support substrate or the like, stress that is caused when temperature distribution occurs in the plane of the piezoelectric sheet, or stress that is caused by nonuniformity in the piezoelectric sheet.

It is an object of the present invention to enable precise measurement of applied pressure in a pressure sensor.

Solution to Problem

Multiple modes will be described below as means for resolving the above issues. These modes may be arbitrarily combined, if needed.

According to an aspect of the present invention, a pressure detecting apparatus includes a pressure sensor, a touch detecting unit, an acquiring unit, a rate-of-change calculating unit, and an applied pressure calculating unit.

The pressure sensor includes a piezoelectric sheet that generates a piezoelectric signal according to a load that is applied.

The touch detecting unit detects contact with the pressure sensor.

The acquiring unit acquires a piezoelectric output based on the piezoelectric signal.

The rate-of-change calculating unit calculates a rate of change with respect to time of the piezoelectric output acquired within an arbitrary time range before a touch detection time when the touch detecting unit detects contact with the pressure sensor.

The applied pressure calculating unit calculates applied pressure by correcting the piezoelectric output acquired after an end time of the time range used in the calculation of the rate of change using the rate of change.

With the above apparatus, the applied pressure is calculated from the piezoelectric output after the correction. Accordingly, for example, when the piezoelectric output increases or decreases, for example, linearly due to the influence of the pyroelectricity, the piezoelectric output acquired after the touch detection time is capable of being corrected using the rate of change described above. In other words, the influence of the change in the occurrence of the electric charge in the piezoelectric sheet, which is caused by change in temperature, is eliminated and, thus, the applied pressure is accurately measured.

The applied pressure calculating unit may multiply the time when the piezoelectric output has been acquired by the rate of change to calculate an amount of drift noise and may subtract the amount of drift noise from the acquired piezoelectric output to perform the correction.

In this apparatus, the accurate applied pressure is acquired through the above correction.

The rate-of-change calculating unit may set the end time of the time range used in the calculation of the rate of change to a predetermined time before the touch detection time.

In general, the timing when contact with the pressure sensor is detected by the touch detecting unit may be delayed from the time when, for example, a finger has actually touched the pressure sensor. In this case, even before the touch detection time, a change in the piezoelectric output based on the applied pressure may occur depending on the detection delay time. In this case, making the end time of the time range close to the touch detection time does not make the change in the piezoelectric output within the time range completely linear. In other words, since the precision of the acquired rate of change is slightly reduced, the precision of the correction is reduced. Accordingly, setting the end time of the time range to a predetermined time before the touch detection time makes the change in the piezoelectric output within the time range more linear. As a result, the rate of change is capable of being calculated more accurately.

According to another aspect of the present invention, a method of controlling a pressure detecting apparatus including a pressure sensor that includes a piezoelectric sheet that generates a piezoelectric signal according to a load that is applied, a touch detecting unit that detects contact with the pressure sensor, an acquiring unit that acquires a piezoelectric output based on the piezoelectric signal includes the following steps:

a rate-of-change calculating step of calculating a rate of change with respect to time of the piezoelectric output acquired within an arbitrary time range before a touch detection time when the touch detecting unit has detected contact with the pressure sensor, and an applied-pressure calculating step of calculating applied pressure by correcting the piezoelectric output acquired after an end time of the time range used in the calculation of the rate of change using the rate of change.

With the above method, the applied pressure is calculated using the piezoelectric output after the correction. Accordingly, for example, when the piezoelectric output increases or decreases, for example, linearly due to the influence of the pyroelectricity, the piezoelectric output acquired after the touch detection time is capable of being corrected using the rate of change described above. In other words, the influence of the change in the occurrence of the electric charge in the piezoelectric sheet, which is caused by change in temperature, is eliminated and, thus, the applied pressure is accurately measured.

The applied-pressure calculating step may include an amount-of-drift-noise calculating step of multiplying the time when the piezoelectric output has been acquired by the rate of change to calculate an amount of drift noise and an amount-of-drift-noise subtracting step of subtracting the amount of drift noise from the acquired piezoelectric output to perform the correction.

According to another aspect of the present invention, a program is stored in a storage unit in a computer and causes the computer to perform the method of controlling the pressure detecting apparatus described above.

Advantageous Effects of Invention

With the pressure detecting apparatus according to the present invention, the pressure to the piezoelectric sheet is appropriately detected to precisely measure the applied pressure to the piezoelectric sheet.

BRIEF DESCRIPTION OF DRAWINGS

DESCRIPTION OF EMBODIMENTS (1) Entire Configuration of Pressure Detecting Apparatus The entire configuration of a pressure detecting apparatus 1 according to an embodiment of the present invention will now be described with reference to FIG. 1. FIG. 1 is a schematic diagram of the pressure detecting apparatus according to a first embodiment of the present invention.

Figure 1:
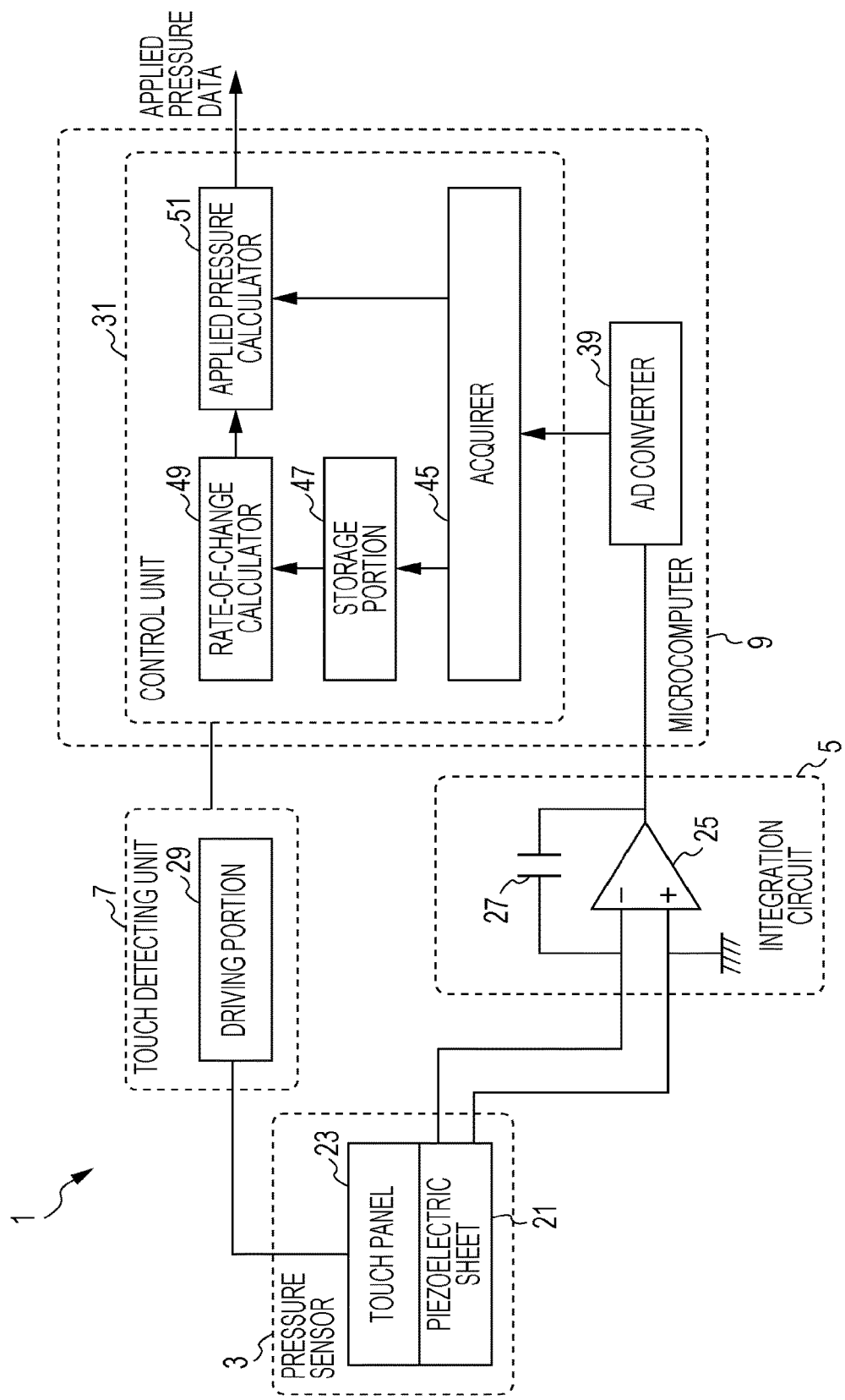
FIG. 1 is a schematic diagram of a pressure detecting apparatus according to an embodiment of the present invention.

The pressure detecting apparatus 1 has a function to measure a pressure load that is applied and a function to detect contact with a pressure sensor.

The pressure detecting apparatus 1 mainly includes a pressure sensor 3, an integration circuit 5, a touch detecting unit 7, and a microcomputer 9.

The pressure sensor 3 includes a piezoelectric sheet 21 and a touch panel 23. The piezoelectric sheet 21 generates a piezoelectric signal according to a load that is applied.

The integration circuit 5 converts the total amount of electric charge output from the piezoelectric sheet 21 into a voltage signal, that is, integrates the piezoelectric signal and outputs the integrated piezoelectric signal. The voltage signal that is output is hereinafter referred to as a "piezoelectric output". This enables applied pressure to the piezoelectric sheet 21 to be precisely measured from a micro piezoelectric signal that is generated due to the amount of change in the applied pressure to the piezoelectric sheet 21. The integration circuit 5 includes an operational amplifier 25 including an input portion connected to the piezoelectric sheet and a capacitor 27 one end of which is connected to the input portion.

The touch detecting unit 7 detects contact of the pressure sensor 3 with the touch panel 23. The touch panel 23 is laminated on the piezoelectric sheet 21 and specifically includes a touch detection electrode (not illustrated).

The microcomputer 9 includes a substrate, a central processing unit (CPU), a random access memory (RAM), a read only memory (ROM), and other electronic components, which are not illustrated in FIG. 1. The CPU, the RAM, the ROM, and the other electronic components are installed on the substrate. The microcomputer 9 mainly includes a control unit 31 and an analog-to-digital (AD) converter 39.

The control unit 31 is a unit for controlling other components on the basis of hardware and software of the computer composed of the CPU and the memories.

The AD converter 39 converts an analog voltage signal output from the integration circuit into a digital voltage signal. The functions of the individual components described above will be described in detail below.

(2) Piezoelectric Sheet

The piezoelectric sheet 21 is a sheet member and has a reference electrode (not illustrated) and a piezoelectric detection electrode (not illustrated) formed on the respective faces of the piezoelectric sheet 21. As a result, a piezoelectric signal according to the load applied to the piezoelectric sheet 21 is generated between the detection electrode (not illustrated) and the reference electrode (not illustrated).

The material of the piezoelectric sheet 21 may be a ceramic piezoelectric material, fluoride polymer or fluoride copolymer, or a high polymer material containing chirality.

The ceramic piezoelectric material is barium titanate, titanate, lead zirconate titanate, potassium niobate, lithium niobate, or lithium tantalate. The fluoride polymer or the fluoride copolymer is polyvinylidene difluoride, vinylidene fluoride-tetrafluoroethylene copolymer, or vinylidene fluoride-trifluoroethylene copolymer. The high polymer material containing chirality is poly-L-lactic acid or poly-R-lactic acid.

The piezoelectric sheet 21 may be a monomorph or a bimorph.

(3) Electrode

The piezoelectric detection electrode (not illustrated), the reference electrode (not illustrated), and the touch detection electrode (not illustrated) are each made of a conductive material. For example, transparent conductive oxide, such as Indium-Tin-Oxide (ITO) or Tin-Zinc-Oxide (TZO), or a conducting polymer, such as polyethylenedioxythiophene (PEDOT), may be used as the conductive material. In this case, the above electrodes are capable of being formed through, for example, vapor deposition or screen printing.

In addition, conductive metal, such as copper or silver, may be used as the conductive material. In this case, the above electrodes may be formed through the vapor deposition or may be formed using metal paste, such as copper paste or silver paste.

Furthermore, carbon nanotubes, metal particles, metal nanofibers, or the likes dispersed in binder may be used as the conductive material.

(4) Touch Detecting Unit

The touch detecting unit 7 is a unit that detects contact with the pressure sensor 3. In this embodiment, the touch detection electrode (not illustrated) of the touch panel 23 is formed so as to be electrically insulated from the piezoelectric detection electrode (not illustrated) of the piezoelectric sheet 21. This enables the touch detecting unit 7 to detect a touch detection signal that is generated when a contact target, such as a finger of a user, is in contact with the main face of the pressure sensor 3 with the touch detection electrode (not illustrated). The touch panel 23 includes a glass cover or a resin cover.

In the pressure sensor 3, the self-capacity or the mutual capacity of the touch detection electrode (not illustrated) is changed when the contact target is in contact with the main face of the pressure sensor 3 and the change is detected by the touch detecting unit 7 (electrostatic capacity method). The use of the electrostatic capacity method enables the touch detecting unit 7 to reliably detect contact of the finger with the pressure sensor 3 even when small force is applied to the pressure sensor 3 with the finger of the user.

A well-known electrostatic measurement apparatus, which is used in an electrostatic capacity type touch panel or the like, may be used as the touch detecting unit 7.

(5) Integration Circuit

The integration circuit 5 has two inputs. One input is connected to the piezoelectric detection electrode (not illustrated) of the piezoelectric sheet 21 and the other input is connected to the reference electrode (not illustrated).

The operational amplifier 25 has two inputs. An input from an inverting input terminal of the operational amplifier 25, to which "−" is added, is connected to the piezoelectric detection electrode (not illustrated) formed in the piezoelectric sheet 21. In contrast, an input from a non-inverting input terminal of the operational amplifier 25, to which "+" is added, is connected to the reference electrode (not illustrated) formed in the piezoelectric sheet 21 and ground potential. In this case, upon input of the piezoelectric signal having a positive potential difference between the piezoelectric detection electrode (not illustrated) and the reference electrode (not illustrated), an amplified piezoelectric signal having a negative potential difference is output from the operational amplifier 25 (inverting amplification).

The operational amplifier 25 is capable of outputting a signal having a magnitude enabling determination of the presence of the signal even when the signals supplied to the two inputs of the operational amplifier 25 are caused by small electric charge. Accordingly, the input of the piezoelectric signal into the operational amplifier 25 enables the applied pressure to the piezoelectric sheet 21 to be precisely measured from the micro piezoelectric signal.

One end of the capacitor 27 is connected to the input of the operational amplifier 25, to which "−" is added. The other end of the capacitor 27 is connected to an output of the operational amplifier 25.

The voltage signal generated due to the amount of change in the applied pressure to the piezoelectric sheet 21 is integrated and the amplified piezoelectric signal is output from the operational amplifier 25 in the above manner.

A well-known operational amplifier may be used as the operational amplifier 25. A capacitor, such as a film capacitor or a ceramic capacitor, may be used as the capacitor 27. The capacity of the capacitor used as the capacitor 27 may be appropriately determined depending on, for example, the strength of the piezoelectric signal.

(6) Microcomputer

The microcomputer 9 includes the CPU, a storage portion, an interface for driving the piezoelectric sensor, and so on. Instead of the microcomputer, the function of the microcomputer may be integrated in one integrated circuit (IC), such as a custom IC.

The control unit 31 controls the operations of other components depending on the result of the detection by the touch detecting unit 7. Accordingly, the control unit 31 is connected to the touch detecting unit 7 and the AD converter 39. The control unit 31 is capable of determining that the touch detecting unit 7 has detected the touch detection signal in response to input of a signal (touch signal) output from the touch detecting unit 7 on the basis of the detection of the touch detection signal.

The control unit 31 includes an acquirer 45, a storage portion 47, a rate-of-change calculator 49, and an applied pressure calculator 51.

The acquirer 45 acquires the piezoelectric output based on the piezoelectric signal. Specifically, the piezoelectric output is constantly acquired and, then, is transmitted to the storage portion 47 and also to the applied pressure calculator 51.

The storage portion 47 stores the acquired piezoelectric output in units of time.

The rate-of-change calculator 49 calculates the rate of change with respect to the time of the piezoelectric output acquired before a touch detection time upon detection of contact with the pressure sensor 3 by the touch detecting unit 7. Specifically, the rate-of-change calculator 49 reads out the piezoelectric output within a predetermined time range from the storage portion 47 to calculate the rate of change described above.

The applied pressure calculator 51 calculates the applied pressure by correcting the acquired piezoelectric output using the rate of change. Specifically, the applied pressure calculator 51 multiplies the time when the piezoelectric output supplied from the acquirer 45 has been acquired by the rate of change described above to calculate an amount of drift noise and subtracts the amount of drift noise from the acquired piezoelectric output to correct the piezoelectric output. This removes the influence of the electric charge caused by, for example, pyroelectricity from applied pressure data.

(7) Control Operation

Figure 2:
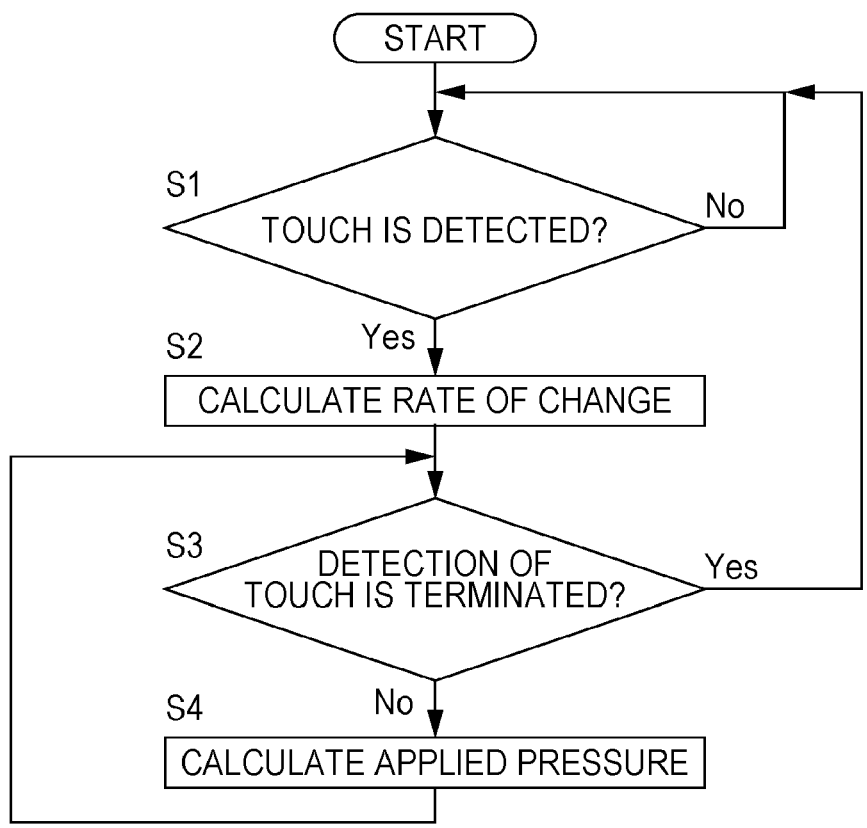
FIG. 2 is a flowchart for describing a process of controlling calculation of a rate of change and calculation of applied pressure.
Figure 3:
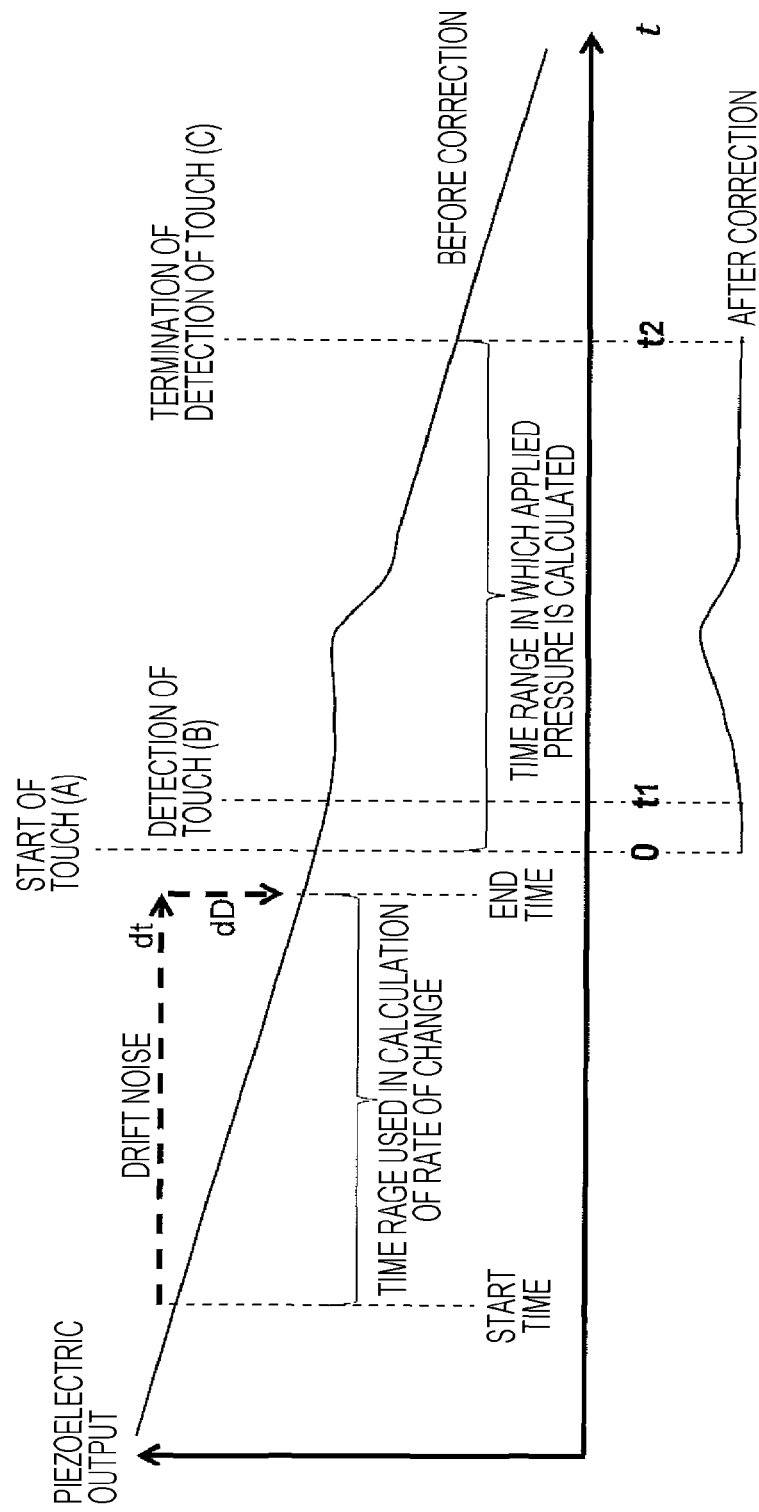
FIG. 3 is a graph indicating piezoelectric outputs before and after correction.

How to control calculation of the applied pressure by the control unit 31 will now be described with reference to FIG. 2 and FIG. 3. FIG. 2 is a flowchart for describing a process of controlling calculation of the rate of change and calculation of the applied pressure. FIG. 3 is a graph indicating the piezoelectric outputs before and after the correction.

FIG. 3 indicates the piezoelectric outputs before and after the correction by the applied pressure calculator 51. As apparent from FIG. 3, in the piezoelectric output before the correction, the electric charge (drift noise) caused by the pyroelectricity is superposed on the electric charge caused by the applied pressure and, thus, the piezoelectric output, which is originally zero, is linearly varied obliquely downward.

Referring to FIG. 2, in Step S1, the control unit 31 determines whether touch is detected on the basis of the signal supplied from the touch detecting unit 7. If touch is detected (YES in Step S1, detection of touch (B) in FIG. 3), the process goes to Step S2.

In Step S2, the rate-of-change calculator 49 in the control unit 31 reads out data about the piezoelectric output within a time range before a time $t_1$ of the detection of touch (B) from the storage portion 47 and calculates the rate of change of the piezoelectric output before the time $t_1$ of the detection of touch (B) on the basis of the data about the piezoelectric output, which has been read out. In this embodiment, the start time of the time range is, for example, a predetermined time before the time of the detection of touch (B). This time is set to a start time 0 and the time of the detection of touch (B) is represented as the time $t_1$ counted from the start time.

In Step S3, the control unit 31 determines whether the detection of touch is terminated on the basis of the signal supplied from the touch detecting unit 7. If the detection of touch is terminated (YES in Step S3, termination of detection of touch (C)), the process goes back to Step S1. If the detection of touch is not terminated (NO in Step S3), the process goes to Step S4.

In Step S4, the applied pressure calculator 51 calculates the applied pressure by correcting the piezoelectric output acquired after the end time of the time range used in the calculation of the rate of change using the rate of change supplied from the rate-of-change calculator 49. Specifically, the applied pressure calculator 51 multiplies the time when the piezoelectric output has been acquired by the rate of change described above to calculate the amount of drift noise (amount-of-drift-noise calculating step). Then, the applied pressure calculator 51 subtracts the amount of drift noise from the acquired piezoelectric output to correct the piezoelectric output (amount-of-drift-noise subtracting step). Such calculation is performed using the following equation:

$$F(t) \propto P(t) - (dD/dt)t - P(0)$$

where $F(t)$ is the applied pressure at a time t, $P(t)$ is the piezoelectric output at the time t, and t is a time when the touch start time is zero.

After Step S4, the process goes back to Step S3. In other words, Step S4 is repeated until the touch is terminated.

The applied pressure is accurately calculated by correcting the piezoelectric output using a gradient (dD/dt) of the calculated drift noise while the touch is being recognized in the above manner. As a result, the piezoelectric output after the correction is acquired, as indicated in FIG. 3.

As described above, in the pressure detecting apparatus 1, the applied pressure is calculated using the piezoelectric output after the correction. Accordingly, the influence of the change in the occurrence of the electric charge in the piezoelectric sheet, which is caused by change in temperature, is eliminated and, thus, the applied pressure is accurately measured.

In a specific embodiment, in the pressure detecting apparatus 1, the applied pressure calculator 51 multiplies the time when the piezoelectric output has been acquired by the rate of change to calculate the amount of drift noise and subtracts the amount of drift noise from the acquired piezoelectric output to correct the piezoelectric output. The above correction provides the accurate applied pressure. However, since it is sufficient for the applied pressure to be calculated using the piezoelectric output after the correction after the end time of the time range used in the calculation of the rate of change, the correction method is not limited to the one described in the present embodiment.

In this embodiment, the end time of the time range used in the calculation of the rate of change is a predetermined time before the time $t_1$ of the detection of touch (B). In general, the timing when contact with the pressure sensor 3 is detected by the touch detecting unit 7 may be delayed from the time when, for example, a finger has actually touched the pressure sensor 3. In this case, even before the time $t_1$ of the detection of touch (B), a change in the piezoelectric output based on the applied pressure may occur depending on the detection delay time. In this case, making the end time of the time range close to the time $t_1$ of the detection of touch (B) does not make the change in the piezoelectric output within the time range used in the calculation of the rate of change completely linear. In other words, since the precision of the acquired rate of change is slightly reduced, the precision of the correction is reduced. Accordingly, setting the end time of the time range used in the calculation of the rate of change to a predetermined time before the time $t_1$ of the detection of touch (B) makes the change in the piezoelectric output within the time range used in the calculation of the rate of change more linear. As a result, the rate of change is capable of being calculated more accurately.

However, the correction of the drift noise is enabled if the time range in which the rate of change with respect to time of the piezoelectric output is calculated is an arbitrary time range before the time $t_1$ of the detection of touch (B) when the touch detecting unit 7 detects contact with the pressure sensor 3.

(8) Other Embodiments

While one embodiment of the present invention has been described, it will be clear that the present invention is not limited to the above embodiment and that many changes and modifications will be obvious to those skilled in the art without departing from the true spirit and scope of the invention. In particular, multiple embodiments and modifications described in the description may be arbitrarily combined, if needed.

(a) In the above embodiment, the rate-of-change calculating step (Step S2) is performed immediately after the touch detecting step (Step S1), as illustrated in FIG. 2. Since this enables the acquisition of the gradient of the drift noise immediately before the detection of touch, the piezoelectric output after the detection of touch is accurately corrected. However, since it is sufficient for the gradient of the drift noise for acquiring the rate of change to be equal or related to the gradient of the drift noise for the detection of touch, the timing of the rate-of-change calculating step is not limited to the one in the above embodiment. For example, the rate-of-change calculating step may be performed at an appropriate time after the previous detection of touch is terminated.

(b) In the above embodiment, the rate-of-change calculator 49 sets the start time of the time range used in the calculation of the rate of change to a predetermined time before the time of the detection of touch (B) when the touch detecting unit 7 has detected contact with the pressure sensor 3. Specifically, the time corresponding to start of touch (A) is set to the start time 0 of the time range used in the calculation of the rate of change.

However, the start time of the time range used in the calculation of the rate of change is not specifically limited. For example, the start time of the time range used in the calculation of the rate of change may be a time before or after the time of the start of touch (A) in FIG. 3.

(c) The case in which the gradient of the drift noise is constant is described in the above embodiment. However, the present invention is effectively applied even when the gradient of the drift noise is slightly varied.

(d) The time range in which the rate of change is used in the calculation may be varied for each touch.

(e) The present embodiment may be combined with another method of accurately detecting the applied pressure.

(f) Although the touch panel in the pressure sensor is laminated on the piezoelectric sheet in the pressure detecting apparatus in the above embodiment, the present invention is not limited to this. For example, the base material forming the touch detection electrode of the touch panel may also serve as the piezoelectric sheet. In addition, contact of the contact target with the pressure sensor is detected using the electrostatic capacity method in the above embodiment. However, the method of detecting contact of the contact target with the pressure sensor is not limited to the electrostatic capacity method. Contact of the contact target with the pressure sensor may be detected using a method other than the electrostatic capacity method (for example, a resistance film method, an optical method, or an ultrasonic method).

INDUSTRIAL APPLICABILITY

The present invention is widely applicable of pressure detecting apparatuses using piezoelectric sheets that generate piezoelectric signals according to loads that are applied.

REFERENCE SIGNS LIST 1 pressure detecting apparatus
3 pressure sensor
5 integration circuit
7 touch detecting unit
9 microcomputer
21 piezoelectric sheet
23 touch panel
25 operational amplifier
27 capacitor
31 control unit
39 AD converter
45 acquirer
47 storage portion
49 rate-of-change calculator
51 applied pressure calculator

The invention claimed is:

1. A pressure detecting apparatus comprising:
a pressure sensor including a piezoelectric sheet configured to generate a piezoelectric signal according to a load that is applied;
touch detecting circuitry configured to detect contact with the pressure sensor; and
control circuitry configured to:
acquire a piezoelectric output based on the piezoelectric signal;
calculate a rate of change with respect to time of the piezoelectric output acquired within an arbitrary time range at least a predetermined time before a touch detection time when the touch detecting circuitry detects contact with the pressure sensor; and
calculate applied pressure by correcting the piezoelectric output acquired after an end time of the time range used in the calculation of the rate of change using the rate of change, wherein
the predetermined time is a fixed value based on a delay from a time when the pressure sensor is touched to a time when contact with the pressure sensor is detected by the touch detecting circuitry.

2. The pressure detecting apparatus according to claim 1, wherein the control circuitry is configured to multiply time when the piezoelectric output has been acquired by the rate of change to calculate an amount of drift noise and subtract the amount of drift noise from the piezoelectric output acquired at a time to perform the correction.

3. A method of controlling a pressure detecting apparatus including a pressure sensor that includes a piezoelectric sheet configured to generate a piezoelectric signal according to a load that is applied, and touch detecting circuitry configured to detect contact with the pressure sensor, the method comprising:
acquiring, using control circuitry, a piezoelectric output based on the piezoelectric signal
calculating, using the control circuitry, a rate of change with respect to time of the piezoelectric output acquired within an arbitrary time range at least a predetermined time before a touch detection time when the touch detecting circuitry detects contact with the pressure sensor; and
calculating, using the control circuit, applied pressure by correcting the piezoelectric output acquired after an end time of the time range used in the calculation of the rate of change using the rate of change, wherein
the predetermined time is a fixed value based on a delay from a time when the pressure sensor is touched to a time when contact with the pressure sensor is detected by the touch detecting circuitry.

4. The method of controlling the pressure detecting apparatus according to claim 3,
wherein the calculating the applied pressure includes multiplying, using control circuitry, time when the piezoelectric output has been acquired by the rate of change to calculate an amount of drift noise and subtracting, using control circuitry, the amount of drift noise from the piezoelectric output acquired at a time to perform the correction.

5. A non-transitory computer readable medium including executable instructions, which, when executed by a computer, cause the computer to perform a method of controlling a pressure detecting apparatus including a pressure sensor that includes a piezoelectric sheet configured to generate a piezoelectric signal according to a load that is applied, and touch detecting circuitry configured to detect contact with the pressure sensor, the method comprising:
acquiring, using control circuitry, a piezoelectric output based on the piezoelectric singal;
calculating, using the control circuitry, a rate of change with respect to time of the piezoelectric output acquired within an arbitrary time range at least a predetermined time before a touch detection time when the touch detecting circuitry detects contact with the pressure sensor; and
calculating, using the control circuitry, applied pressure by correcting the piezoelectric output acquired after an end time of the time range used in the calculation of the rate of change using the rate of change, wherein
the predetermined time is a fixed value based on a delay from a time when the pressure sensor is touched to a time when contact with the pressure sensor is detected by the touch detecting circuitry.

* * * * *